Sept. 29, 1942.  J. H. HORSTMAN  2,297,624
BICYCLE STAND
Filed May 22, 1940  2 Sheets-Sheet 1

Inventor
John H. Horstman
Maréchal & Roe
Attorneys

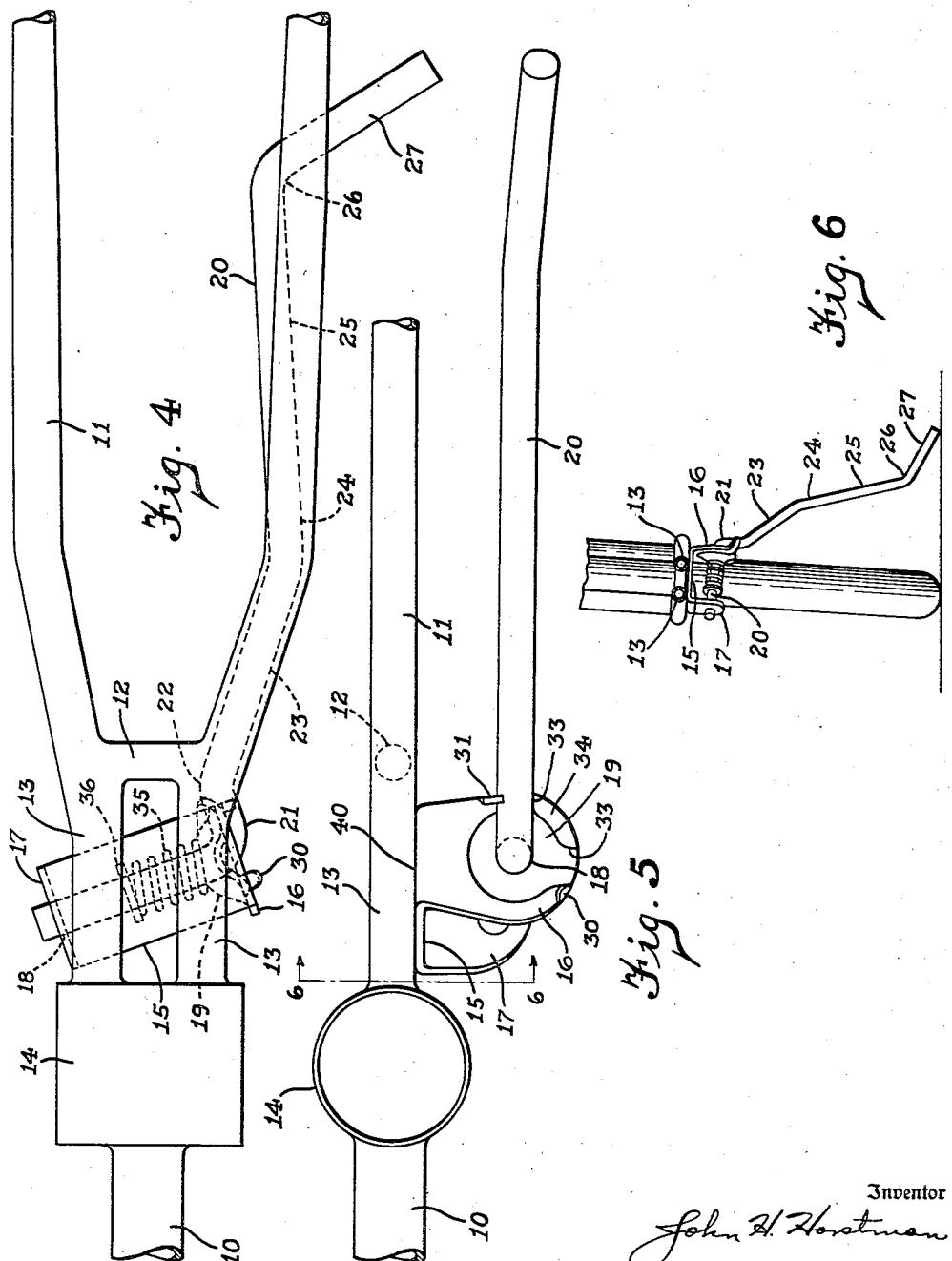

Patented Sept. 29, 1942

2,297,624

UNITED STATES PATENT OFFICE 2,297,624

BICYCLE STAND

John H. Horstman, Dayton, Ohio, assignor to The Huffman Manufacturing Company, Dayton, Ohio, a corporation of Ohio Application May 22, 1940, Serial No. 336,611

1 Claim. (Cl. 280—301)

This invention relates to bicycles and more particularly to bicycle stands.

It is the principal object of the invention to provide a stand for a bicycle which is simple and inexpensive to manufacture, which is sturdy and rugged in construction and capable of withstanding continued hard usage, and which is easily adjusted from its extended operative position to its withdrawn inoperative position where it is folded back in a protected location.

It is a further object to provide a stand of this character adapted to be attached permanently to the frame of a bicycle in predetermined position thereon and in a simple and effective manner as by brazing, welding, or the like. It is a still further object to provide a stand of this character in which the rotation of the supporting rod takes place about an axis inclined to the horizontal so that the proper path of movement of the ground engaging part of the stand is provided, the stand furthermore being of such construction that it can be manufactured rapidly and inexpensively with the least number of manufacturing operations.

Other objects and advantages will be apparent from the following description, the accompanying drawings and the appended claim.

In the drawings,

Fig. 4 is an inverted view showing the stand in position upon the bicycle with the ground supporting part being withdrawn into inoperative position;

Fig. 5 is a side elevational view of Fig. 4; and

Fig. 6 is a sectional view on the line 6—6 of Fig. 5 and on a smaller scale showing the stand engaging the ground and supporting the bicycle in upright position.

Figure 2:
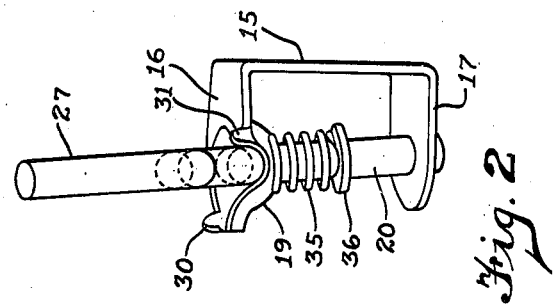
Fig. 2 is a view in end elevation of the device shown in Fig. 1.

Referring to the drawings which disclose a preferred embodiment of the invention, the bicycle frame is indicated generally at 10, the frame comprising the usual structural parts including the rear fork members 11 between which the rear wheel is received and mounted. The rear fork members are braced by a cross member 12 and are provided with integral extensions 13 which join the hub 14 in which the driving sprocket wheel is mounted. For a limited distance the extension frame members 13 lie parallel and relatively closely spaced to each other as indicated in Fig. 4. The stand of the present invention is constructed and arranged for permanent attachment to the frame, preferably in the zone of the frame extension members 13, this having been found to provide a convenient location for the attachment of the stand, and one in which proper support for the bicycle is provided when the stand is in use and one in which the stand can be properly folded to a protected position when it is not in use.

The stand proper of this invention comprises a base plate 15 in the form of a rectangular stamping of suitable metal, preferably having a longitudinal dimension sufficient to overlie and extend slightly beyond both frame extension members 13 in operative position thereon. The plate is formed integrally with arms 16, 17 which are bent downwardly therefrom at either end, and in such direction that the arms extend substantially perpendicularly with respect to the plate 15. Since these arms are formed integrally and bent to this right angular position, the manufacture thereof can take place quite inexpensively, the forming operations being simplified and reduced in number to as few as possible.

Figure 1:
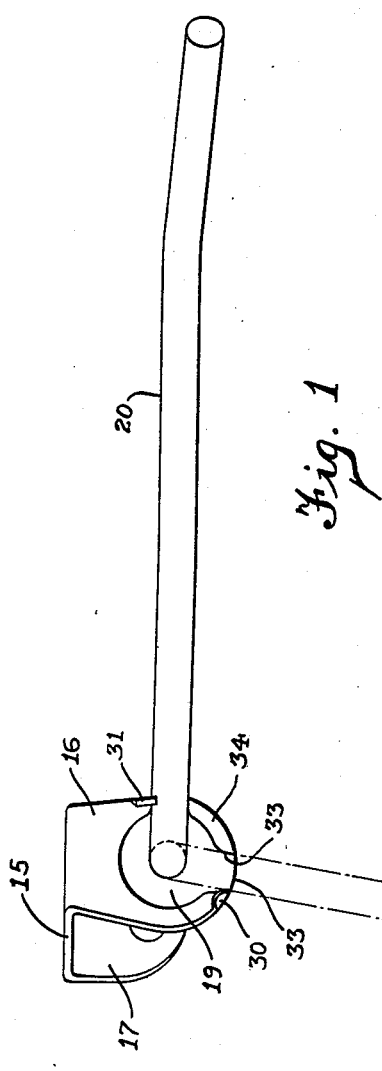
Fig. 1 is a view in side elevation of the stand constructed in accordance with the present invention in the position which it occupies in use upon the bicycle the dotted line showing the operative position of the stand.
Figure 3:
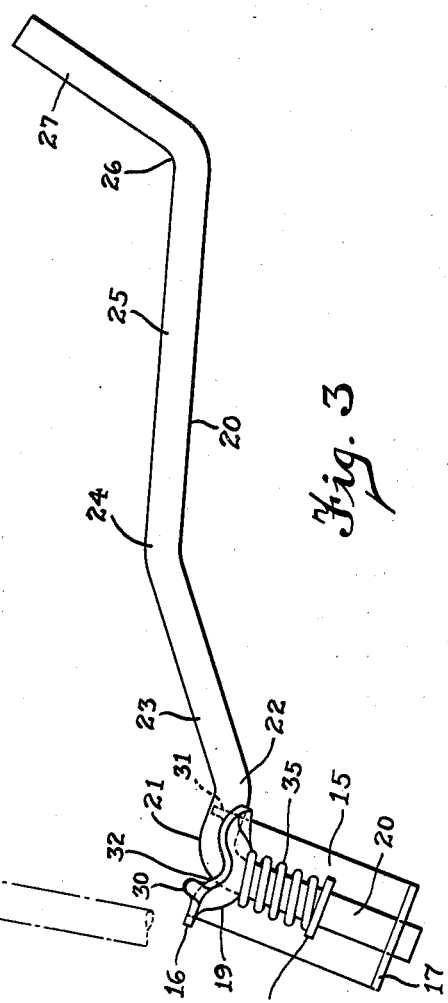
Fig. 3 is an inverted plan view of the stand.

Each arm is provided with an aperture 18, the apertures facing each other and being in alignment with respect to the longitudinal axis of the base plate. However, one of the apertures is located at a different elevation than the other, the aperture formed in arm 16, which as shown in Fig. 1 is the trailing arm in the assembled position of the device upon the bicycle, being positioned somewhat below the aperture in arm 17 which is the leading arm. The purpose of this offset relation in a vertical plane will be described hereinafter. Also a reinforcing bead or gusset 19 is preferably welded, brazed, or formed at the point where arm 16, or both arms 16 and 17 join the plate 15, to strengthen and reinforce the arms and to reduce the tendency toward bending under load.

A rod 20 is rotatably mounted in the arms, having such diameter that it will engage and be properly journaled in the two apertures 18, the apertures having a diameter slightly larger than that of the rod, to provide for such rotation in the angular position in which the rod is thus supported. While the amount of vertical offset may be varied, applicant has found that satisfactory results are secured where the axis of the rod extending between the two arms makes an angle of about 5° with the horizontal axis through the base plate.

The rod is formed with a right angularly bent portion 21 upon the outer face of arm 16, and thereafter is bent as shown at 22 at an angle such as to extend outwardly away from the bicycle as indicated by the part 23. A further bend 24 is provided in the opposite direction and an extended portion 25 of the rod projects downwardly toward the ground, a final outward bend 26 sharper than bend 24 providing for the termination of the rod in a foot portion 27 at such angle as to engage the ground in supporting relation thereto.

Arm 16 is provided with means for yieldably retaining the rod in its two positions of adjustment. This arm is provided with outwardly extending lugs 30 and 31 functioning to terminate the rotation of the rod at the opposite ends of its adjustable movement, recesses 32 and 33 being formed respectively adjacent the lugs to provide for yieldably retaining the rod in either of its adjusted positions. A raised lug portion 34 extends between the recesses, so that the rod normally falls into one or the other of the recesses where it is securely retained until further adjusted. As indicated recess 32 is positioned so that when the portion 21 of the rod occupies such recess, the remaining portions of the rod extend substantially horizontally. Recess 33 is spaced angularly from recess 32 at a distance somewhat greater than 90° at such position that the arm in lowered operative position travels slightly beyond the vertical, such as about 5° or the like, as shown in Fig. 1, so that with the rod in operative position, the foot portion will extend at the proper angle into contact with the ground; in the inoperative position, the rod lies substantially horizontally and closely parallel with the rear fork member 13.

The rod is resiliently urged toward one or the other of the recesses by means of a coiled spring 35 surrounding the rod between the two arms and bearing at one end against the inner face of arm 16 and having engagement with the rod by conventional means such as the C-shaped washer 36. The open end of this washer slips over and engages a slot formed in the rod and the spring 35 bears against the outer surface thereof. It will be obvious that this spring under compression provides for yieldably urging the portion 21 of the rod into the respective recesses 32 or 33, but provides for the lifting thereof away from the recesses and over the cam surface 34 when it is desired to move the stand from one position to the other.

This stand is attached to the bicycle permanently and preferably in an integral manner as by brazing or welding the plate 15 to the lower side of the frame extension members 13, the line of weld being indicated at 40. In order to provide for movement of the stand in the proper plane to assume its two positions, the plate is not mounted in a direction transverse of the axis of the bicycle, but with the longitudinal dimension of the plate 16 at an acute angle to the transverse axis of the frame, such as an angle of the order of 20° as indicated clearly in Figs. 4 and 5. This angular mounting provides for locating the two arms in offset relation to each other with respect to the longitudinal dimension of said frame members, and in conjunction with the angular relation in which the rod itself is supported in the arms, and the degree of rotation provided for by the location of recess 33, provides for movement of the lower portions of the stand first into proper supporting relation with the ground, and secondly into such folded or inoperative position that the parts 23, 25 and 27 closely follow the lower fork sides 11, as shown in Fig. 4. This provides for the folding back of the stand to a position where it is largely protected by the fork and thus out of the way, leaving only the portion 26 thereof extending outwardly a limited distance such that it can be engaged by the heel of the user and moved downwardly to its operative position. And as shown in Fig. 6, when in use upon the bicycle the device provides a highly effective and satisfactory support for the bicycle, providing for supporting the same in a substantially upright position, and the arrangement described makes it possible to construct the entire device simply and economically.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A bicycle stand of the character described adapted for attachment to the lower frame members of a bicycle comprising a single flat strip of metal having two opposite end portions bent into U-shape substantially perpendicular to a central base portion, said ends being provided with apertures in alignment in the plane normal to the longitudinal center line of the base portion but at different elevations with respect thereto, the base portion being attached to said frame members with its longitudinal axis at a small acute angle to the transverse axis of the frame members, a rod rotatably supported in said apertured end portions at a small acute angle to the horizontal and to the transverse axis of the frame members, the rod having an angularly bent portion extending downwardly from the trailing end portion and adapted to engage the ground to support the bicycle and being rotatable to an upper withdrawn position closely paralleling said frame members, said trailing end portion being formed with a raised portion and recessed portions at either side of said raised portion providing for retaining said rod in either said upper withdrawn or in a lower operative position, said recessed portions having stops at their opposite ends spaced by an angle of more than 90° to confine rotary travel of said rod between said withdrawn position and a lower operative position beyond the vertical, and means for yieldably retaining said rod in engagement with either of said recessed portions.

JOHN H. HORSTMAN.